US012106742B2

(12) United States Patent
Sato et al.

(10) Patent No.: US 12,106,742 B2
(45) Date of Patent: Oct. 1, 2024

(54) ELECTRONIC MUSICAL INSTRUMENT, SOUND PRODUCTION METHOD FOR ELECTRONIC MUSICAL INSTRUMENT, AND STORAGE MEDIUM

(71) Applicant: CASIO COMPUTER CO., LTD., Tokyo (JP)

(72) Inventors: Hiroki Sato, Tokyo (JP); Hajime Kawashima, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 679 days.

(21) Appl. No.: 17/344,807

(22) Filed: Jun. 10, 2021

(65) Prior Publication Data

US 2021/0407480 A1 Dec. 30, 2021

(30) Foreign Application Priority Data

Jun. 24, 2020 (JP) ................................ 2020-109144

(51) Int. Cl.
*G10H 1/28* (2006.01)
*G10H 1/00* (2006.01)

(52) U.S. Cl.
CPC ............ *G10H 1/28* (2013.01); *G10H 1/0008* (2013.01); *G10H 2210/066* (2013.01); *G10H 2210/185* (2013.01); *G10H 2210/571* (2013.01)

(58) Field of Classification Search
CPC .. G10H 1/28; G10H 1/0008; G10H 2210/066; G10H 2210/185; G10H 2210/571
(Continued)

(56) References Cited

U.S. PATENT DOCUMENTS 4,171,658 A * 10/1979 Aoki ........................ G10H 1/28 84/DIG. 12
4,191,081 A * 3/1980 Deutsch .................. G10H 1/28 84/669
(Continued)

FOREIGN PATENT DOCUMENTS

EP 4027330 A1 * 7/2022 ........... G10H 1/0025
GB 1595555 A * 8/1981 ............... G10H 1/28
(Continued)

OTHER PUBLICATIONS

Japanese Office Action dated Apr. 19, 2022 in a counterpart Japanese patent application No. 2020-109144. (A machine translation (not reviewed for accuracy) attached.).

*Primary Examiner* — Christina M Schreiber
(74) *Attorney, Agent, or Firm* — CHEN YOSHIMURA LLP

(57) ABSTRACT

An electronic musical instrument includes a plurality of performance elements that specify pitch data; a sound source that produces musical sounds; and a processor configured to perform the following: when a user performance of the plurality of performance elements satisfies a prescribed condition, instructing the sound source to produce automatic arpeggio playing sounds corresponding to pitch data specified by the user performance; and when the user performance of the plurality of performance elements does not satisfy the prescribed condition, instructing the sound source to produce a sound of a pitch data specified by the user performance without producing the automatic arpeggio playing sound.

12 Claims, 5 Drawing Sheets

(58) Field of Classification Search
USPC .............................................................. 84/609
See application file for complete search history.

(56) References Cited

U.S. PATENT DOCUMENTS

| | | | | | |
|---|---|---|---|---|---|
| 4,217,804 | A * | 8/1980 | Yamaga | G10H 1/28 | 84/DIG. 12 |
| 4,267,762 | A * | 5/1981 | Aoki | G10H 1/28 | 84/DIG. 22 |
| 4,356,752 | A * | 11/1982 | Suzuki | G10H 1/38 | 84/DIG. 22 |
| 4,402,244 | A * | 9/1983 | Nakada | G10H 1/36 | 84/478 |
| 6,166,316 | A * | 12/2000 | Takahashi | G10H 1/28 | 84/657 |
| 6,506,969 | B1 * | 1/2003 | Baron | G10H 1/0025 | 84/613 |
| 2012/0227575 | A1 * | 9/2012 | Nakagawa | G10H 1/28 | 84/735 |
| 2013/0340594 | A1 * | 12/2013 | Uemura | G10H 7/02 | 84/605 |
| 2021/0407474 | A1 * | 12/2021 | Sato | G10H 1/46 | |
| 2021/0407480 | A1 * | 12/2021 | Sato | G10H 1/386 | |
| 2022/0343884 | A1 * | 10/2022 | Nagata | G10H 1/28 | |
| 2023/0041040 | A1 * | 2/2023 | Sato | G10H 1/24 | |

FOREIGN PATENT DOCUMENTS

| | | | | |
|---|---|---|---|---|
| JP | H03172896 | A * | 7/1991 | |
| JP | H06274170 | A * | 9/1994 | |
| JP | H09244660 | A * | 9/1997 | |
| JP | H10198374 | A * | 7/1998 | |
| JP | H10312190 | A * | 11/1998 | |
| JP | H11-24656 | A | 1/1999 | |
| JP | 2001022356 | A * | 1/2001 | |
| JP | 2005-77763 | A | 3/2005 | |
| JP | 2012-189901 | A | 10/2012 | |
| JP | 2014174205 | A * | 9/2014 | G10H 1/02 |
| JP | 2022006732 | A * | 1/2022 | G10H 1/0008 |
| JP | 7176548 | B2 * | 11/2022 | G10H 1/0008 |
| WO | WO-2021044562 | A1 * | 3/2021 | G10H 1/28 |

* cited by examiner

ELECTRONIC MUSICAL INSTRUMENT, SOUND PRODUCTION METHOD FOR ELECTRONIC MUSICAL INSTRUMENT, AND STORAGE MEDIUM

BACKGROUND OF THE INVENTION

Technical Field

The present disclosure relates to an electronic musical instrument, a sound production method for an electronic musical instrument, and a storage medium therefor.

Background Art

Some electronic musical instruments are equipped with an automatic arpeggio function that generates arpeggio playing sounds as distributed chords according to a predetermined tempo and pattern, instead of simultaneously producing all the musical sounds pressed by the performer. See, e.g., Japanese Patent Application Laid-Open Publication No. 2005-77763.

SUMMARY OF THE INVENTION

The features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an electronic musical instrument, including: a plurality of performance elements that specify pitch data; a sound source that produces musical sounds; and a processor configured to perform the following: when a user performance of the plurality of performance elements satisfies a prescribed condition, instructing the sound source to produce automatic arpeggio playing sounds corresponding to pitch data specified by the user performance; and when the user performance of the plurality of performance elements does not satisfy the prescribed condition, instructing the sound source to produce a sound of a pitch data specified by the user performance without producing the automatic arpeggio playing sound.

In another aspect, the present disclosure provides a method of sound production performed by a processor in an electronic musical instrument that includes, in addition to the processor, a plurality of performance elements that specify pitch data and a sound source that produces musical sounds, the method including, via said processor: when a user performance of the plurality of performance elements satisfies a prescribed condition, instructing the sound source to produce automatic arpeggio playing sounds corresponding to pitch data specified by the user performance; and when the user performance of the plurality of performance elements does not satisfy the prescribed condition, instructing the sound source to produce a sound of a pitch data specified by the user performance without producing the automatic arpeggio playing sound.

In another aspect, the present disclosure provides a non-transitory computer-readable storage medium storing a program executable by a processor in an electronic musical instrument that includes, in addition to the processor, a plurality of performance elements that specify pitch data and a sound source that produces musical sounds, the program causing the processor to perform the following: when a user performance of the plurality of performance elements satisfies a prescribed condition, instructing the sound source to produce automatic arpeggio playing sounds corresponding to pitch data specified by the user performance; and when the user performance of the plurality of performance elements does not satisfy the prescribed condition, instructing the sound source to produce a sound of a pitch data specified by the user performance without producing the automatic arpeggio playing sound.

It is to be understood that both the foregoing general description and the following detailed description are exemplary and explanatory, and are intended to provide further explanation of the invention as claimed.

DETAILED DESCRIPTION OF EMBODIMENTS

Figure 1:
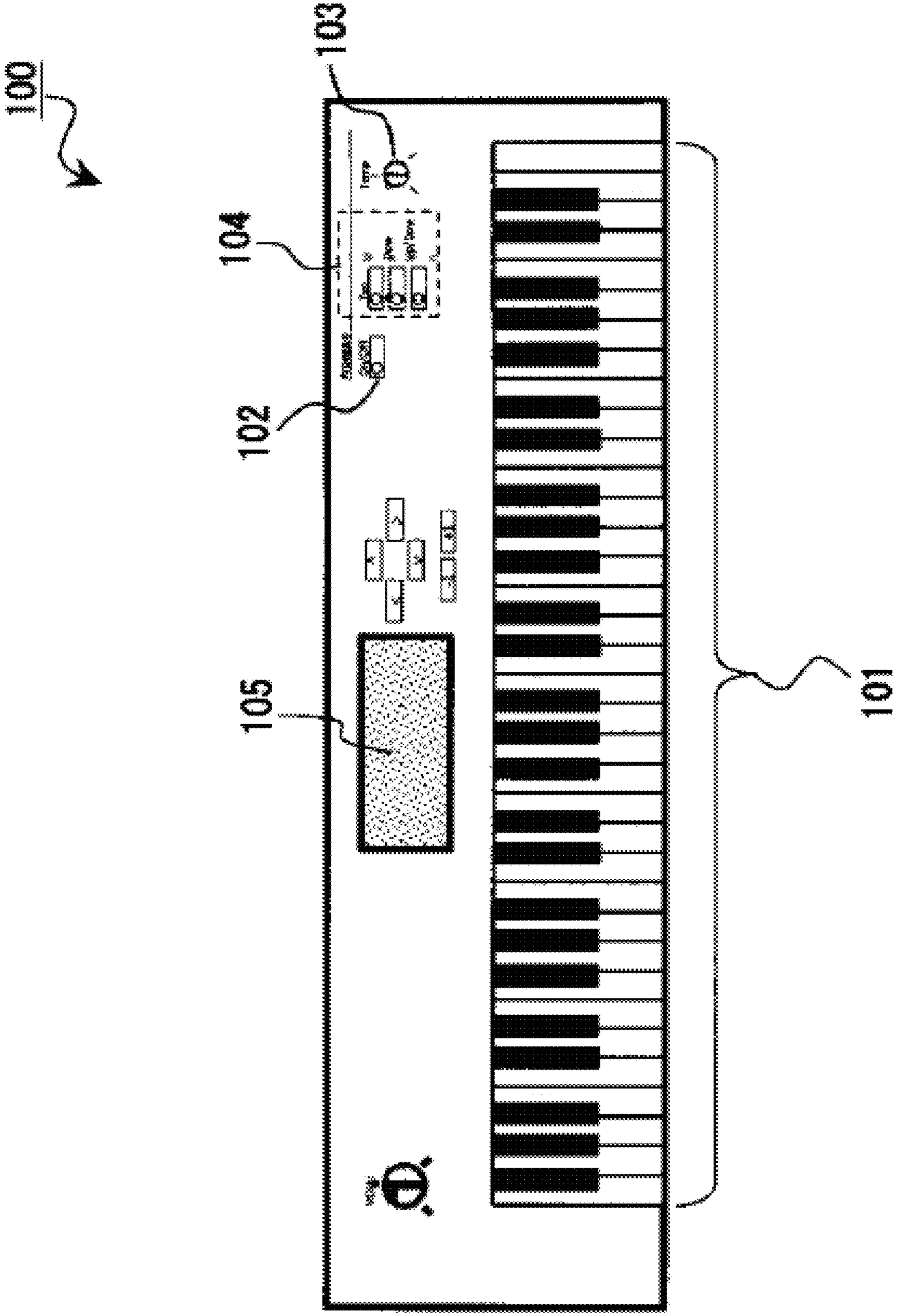
FIG. 1 is a diagram showing an external appearance of an embodiment of an electronic keyboard instrument of the present disclosure.

Hereinafter, embodiments for carrying out the present disclosure will be described in detail with reference to the drawings. FIG. 1 is a diagram showing an exemplary external appearance of an embodiment 100 of an electronic keyboard instrument. The electronic keyboard instrument 100 includes a keyboard 101 composed of keys that are multiple (for example, 61) performance elements, an automatic arpeggio ON/OFF button 102, a TEMPO knob 103, a TYPE button group 104, and an LCD (Liquid Crystal Display) 105 that displays various setting information. In addition, although not particularly shown, the electronic keyboard instrument 100 includes a volume knob, a pitch bend, a bender/modulation wheel for performing various modulations and the like. Further, although not particularly shown, the electronic keyboard instrument 100 is provided with a speaker(s) for emitting a musical sound generated by the performance on the back surface, the side surface(s), the rear surface, or the like.

The performer can select whether to enable or disable the automatic arpeggio by pressing the automatic arpeggio ON/OFF button 102 arranged in the arpeggio section on the upper right panel of the electronic keyboard instrument 100, for example.

The performer can also select one of the following three types of automatic arpeggios by the TYPE button group 104, which is also arranged in the Arpeggio section.

1. Up button: A button for arpeggiating the pressed notes in a rising order. For example, if notes C, E, G in the same octave are the targets of the arpeggio, the arpeggio playing is repeated as in C, E, G, C, E, G, and so on.
2. Down button: A button for arpeggiating the pressed notes in a descending order. For example, if C, E, G in the same octave are the targets of the arpeggio, the arpeggio playing is repeated as in G, E, C, G, E, C . . . .

3. Up/Down button: A button for arpeggiating of the pressed notes in the ascending and descending order. For example, if C, E, G in the same octave are the targets of the arpeggio, the arpeggio playing is repeated as in C, E, G, E, C, E, G, E, C, . . . .

Further, the performer can adjust the speed of the automatic arpeggio playing by the position of the TEMPO knob 103 that is also arranged in the arpeggio section. When the TEMPO knob 103 is turned to the right, the interval between notes becomes shorter, and when it is turned to the left, the interval becomes longer.

When the performer presses the automatic arpeggio ON/OFF button 102, the automatic arpeggio mode is set, and the LED (Light Emitting Diode) of the automatic arpeggio ON/OFF button 102 lights up. In this state, when the performer presses the automatic arpeggio ON/OFF button 102 again, the automatic arpeggio mode is canceled and the LED of the automatic arpeggio ON/OFF button 102 is turned off.

Figure 2:
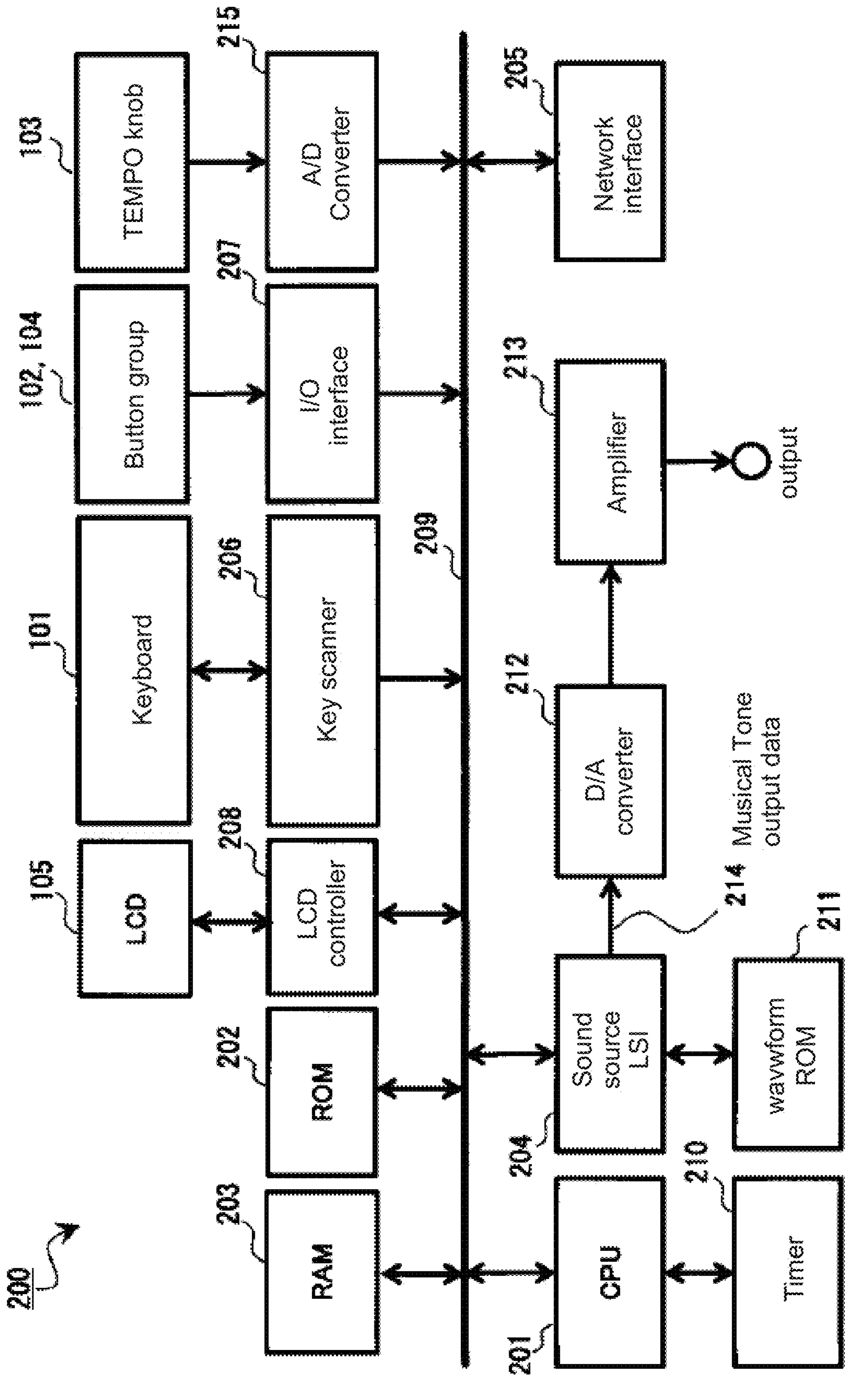
FIG. 2 is a block diagram showing a hardware configuration example of an embodiment of a control system in the main body of an electronic keyboard instrument.

FIG. 2 is a diagram showing a hardware configuration example of an embodiment of the control system 200 in the main body of the electronic keyboard instrument 100 of FIG. 1. In FIG. 2, the control system 200 includes a CPU (central processing unit) 201, which is a processor, a ROM (read-only memory) 202, a RAM (random access memory) 203, a sound source LSI 204 (large-scale integrated circuit), which is a sound source, a network interface 205, a key scanner 206 to which the keyboard 101 of FIG. 1 is connected, an I/O interface 207 to which the automatic arpeggio ON/OFF button 102 and the TYPE button group 104 of FIG. 1 are connected, an A/D (analog/digital) converter 215 to which the TEMPO knob 103 of FIG. 1 is connected, and an LCD controller 208 to which the LCD 105 of FIG. 1 is connected, which are respectively connected via the system bus 209. The musical tone output data 214 output from the sound source LSI 204 is converted into an analog musical tone output signal by the D/A converter 212. The analog musical tone output signal is amplified by the amplifier 213 and then output from a speaker or an output terminal (not shown).

The CPU 201 executes control operations of the electronic keyboard instrument 100 of FIG. 1 by executing a control program stored in the ROM 202 while using the RAM 203 as the work memory.

Figure 4:
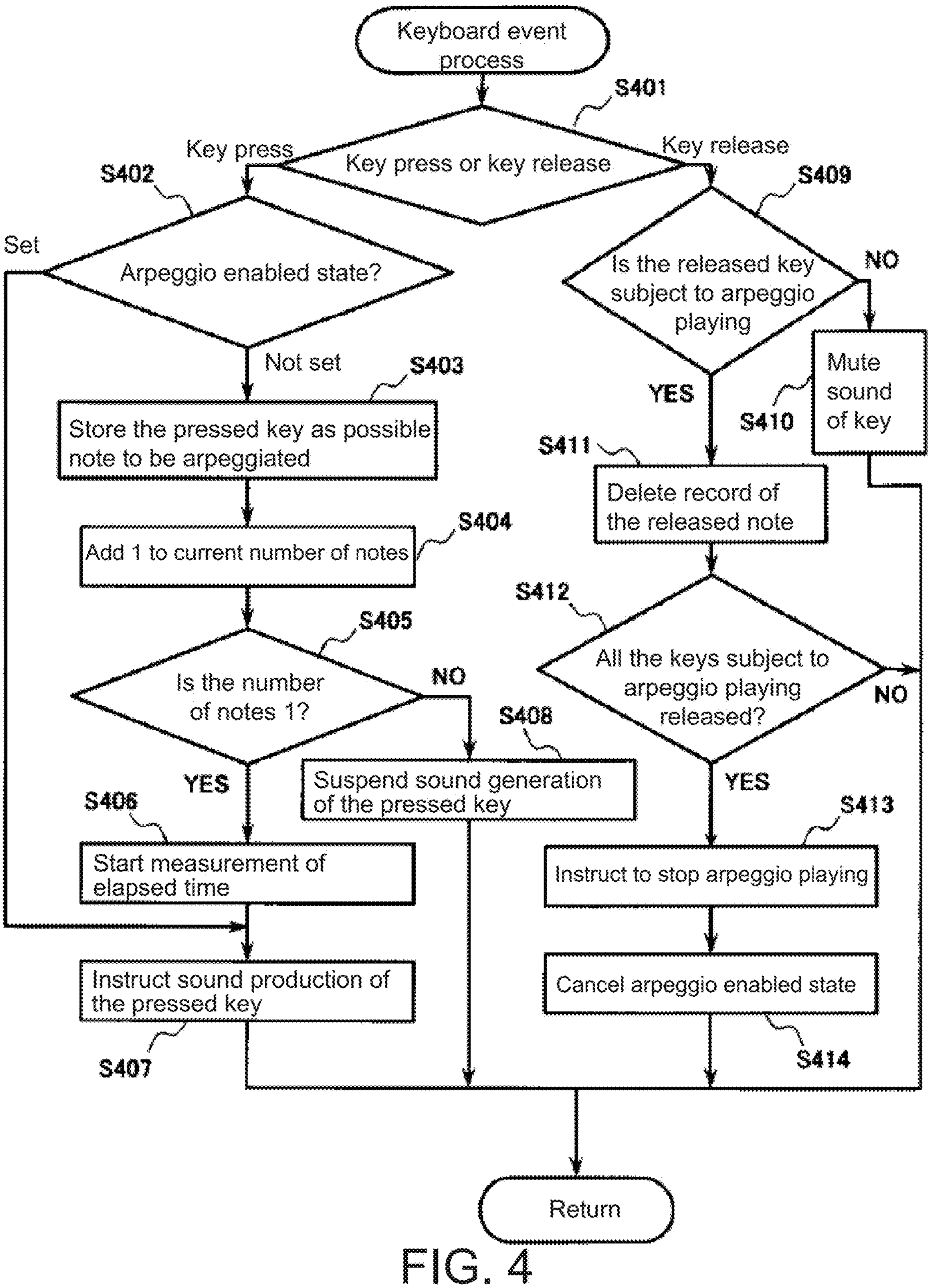
FIG. 4 is a flowchart showing an example of a keyboard event processing.

The key scanner 206 constantly scans the key-pressed/released state of the keyboard 101 of FIG. 1, generates an interrupt of the key event of FIG. 4, and transmits the change of the key-pressed state of the key on the keyboard 101 to the CPU 201. When this interrupt occurs, the CPU 201 executes a keyboard event processing, which will be described later, using the flowchart of FIG. 4. In this keyboard event processing, the CPU 201 executes a control process for shifting to an automatic arpeggio playing in response to a key pressing event(s).

The I/O interface 207 detects the operation states of the automatic arpeggio ON/OFF button 102 and the TYPE button group 104 of FIG. 1 and transmits the operation states to the CPU 201.

The A/D converter 215 converts analog data indicating the operation position of the TEMPO knob 103 of FIG. 1 into digital data and transmits it to the CPU 201.

A timer 210 is connected to the CPU 201. The timer 210 generates an interrupt at regular time intervals (for example, 1 millisecond). When this interrupt occurs, the CPU 201 executes an elapsed time monitoring process described later using the flowchart of FIG. 5. In this elapsed time monitoring process, the CPU 201 determines whether or not a prescribed performance operation has been executed by the performer on the keyboard 101 of FIG. 1. For example, in the elapsed time monitoring process, the CPU 201 determines whether or not the player's operation of playing a chord using a plurality of keys on the keyboard 101 occurs.

More specifically, in the elapsed time monitoring process, when the arpeggio playing sound is not being produced, the CPU 201 measures an elapsed time from the key press detection timing of the first key press operation for any key on the keyboard 101 of FIG. 1 detected by the key scanner 206, and determines whether a second key press operation on one or more of a prescribed number of keys that are different from the first key pressed is detected by the key scanner 206 within a prescribed elapsed time that defines simultaneous key pressing period.

If the result of the determination is positive, the CPU 201 instructs the sound source LSI 204 to produce arpeggio playing sounds corresponding respective pitch data specified by the first key press operation and the second key press operation, which correspond to pitch data group of keys pressed during the above-mentioned prescribed elapsed time. Along with this operation, the CPU 201 sets the automatic arpeggio enabled state. If the result of the above determination is negative, the CPU 201 does not instruct the sound source LSI 204 to produce the arpeggio playing sound, and instead instructs the sound source LSI 204 to produce normal playing sounds corresponding to the pitch data specified by the first key press operation and the second key press operation.

In the above-mentioned keyboard event processing, when the automatic arpeggio enabled state is on (set), the CPU 201 does not instruct the sound source LSI 204 to stop the arpeggio playing sound production until all of the keys corresponding to the pitch data of the arpeggio playing sounds are released. When all of such keys are released, the CPU 201 instructs the sound source LSI 204 to stop the production of the arpeggio playing sound and cancels the automatic arpeggio enabled state.

While the automatic arpeggio enabled state is being canceled, CPU 201 performs the process of determining whether or not the number of keys pressed within the elapsed time that defines simultaneous key pressing period has reached the prescribed number that can be regarded as chord performance in the above-mentioned elapsed time monitoring process. When a key release event of a key that was not involved in the automatic arpeggio playing occurs, the CPU 201 instructs the sound source LSI 204 to stop the production of the normal sound corresponding to that key.

The waveform ROM 211 is connected to the sound source LSI 204. In accordance with the sound production instructions from the CPU 201, the sound source LSI 204 starts reading the musical tone waveform data 214 from the waveform ROM 211 at a speed corresponding to the pitch data included in the sound production instructions, and outputs the data to the D/A converter 212. The sound source LSI 204 may have, for example, the ability to simultaneously produce a maximum of 256 voices by time division processing. According to the mute instructions from the CPU 201, the sound source LSI 204 stops reading the musical tone waveform data 214 corresponding to the mute instructions from the waveform ROM 211, and ends the sound production of the corresponding musical sound.

The LCD controller 208 is an integrated circuit that controls the display state of the LCD 104 of FIG. 1.

The network interface 205 is connected to a communication network such as Local Area Network (LAN), and receives control programs (see the flowcharts of the keyboard event processing and the elapsed time monitoring processing described later) and/or data used by the CPU 201 from an external device. Then, they can be loaded into RAM 203 or the like and used by the CPU 201.

An operation example of the embodiment shown in FIGS. 1 and 2 will be described. The condition for determining the chord playing for starting the sound production of the automatic arpeggio playing is that the chord playing by pressing N or more keys occurs almost at the same time (within T seconds). When it is determined that this condition is satisfied, the automatic arpeggio mode is enabled until all the keys corresponding to the pressed keys for which the determination is made are released, and the sound production instructions to produce the arpeggio playing sound for only the keys that constitutes the chord at the time of the determination are issued to the sound source LSI 204, and the music tone waveform data 214 for the arpeggio playing are output from the sound source LSI 204.

In the above automatic arpeggio enabled state, in order to maintain natural arpeggio playing state, the automatic arpeggio enabled state is maintained even if some of the keys for which the above determination was made are released and the number of pressed keys becomes less than N notes. However, when all the keys for which the above determination was made are released, the automatic arpeggio enabled state is canceled.

In addition, once the automatic arpeggio is enabled (turned on), a musical sound of the pitch corresponding to a new key press event will be the normal sound, no matter what the performer plays, as long as that state is maintained, and automatic arpeggio playing for the new note is not performed. This scheme is implemented because, for example, if you hold down 3 notes with your left hand to trigger the automatic arpeggio playing and thereafter hold down 3 notes at the same time with your right hand to shift to a 6-note arpeggio playing, the resulting arpeggio playing would become unnatural.

The number of notes N for determination of a chord play and the elapsed time T that defines simultaneous key playing period may be set separately, for example, for each performance situation by storing them in a registration memory (not shown), for example.

For example, the prescribed elapsed time T, that defines a time period of simultaneous key pressing events, can be set to about T=10 milliseconds in a situation in which a weak keystroke is not used for the automatic arpeggio playing sound. This is a case where, for example, notes (arpeggio playing sound) that are desired to be included in the arpeggio and a note (normal playing sound) that is not to be included in the arpeggio playing are played at short intervals. More specifically, by this setting, it is possible to deal with the case where you want to have the electronic instrument recognize your right hand playing as a solo playing (i.e., not arpeggio playing) by just slightly shifting the timing of the right hand playing after playing an arpeggio chord with your left hand. Alternatively, when a weak keystroke is used for the automatic arpeggio playing sound, T=50 milliseconds can be set. For example, although it takes some time to separate the solo playing sound (normal sound) from the arpeggio playing sound, the keyboard speed is slow during such a low-speed keystroke performance, so fluctuations in timing of detecting the automatic arpeggio enabled state would become large if the prescribed time T is too short. Thus, a long prescribed elapsed time T is suitable in this case.

Further, for the number of notes N for the chord playing determination, in a situation where an arpeggio is played with one hand and a solo is performed with the other hand; for example, the left hand is the arpeggio, the right hand is the melody line, or the right hand is the arpeggio, and the left hand is a base line or the like, N=3 may be set. In this case, an automatic arpeggio can be started with three notes, so a chord without an arpeggio can only be played up to two notes, but this case is suitable when the arpeggio is controlled with only one hand and a solo or bass is played with the other hand. Alternatively, N=5, for example, may be set in a situation where a chord playing to which the automatic arpeggio is not applied and a chord playing to which the automatic arpeggio is applied are to be played at the same time (i.e., the two cases are mixed). In this case, a chord playing of 4 or less notes does not trigger the automatic arpeggiating, and a chord playing of 5 or more notes triggers the automatic arpeggiating. Although the automatic arpeggio playing is performed only for 5 or more notes, this case is suitable when the performer basically plays many chords without arpeggiating.

In this way, the value of N can be set appropriately.

Figure 3:
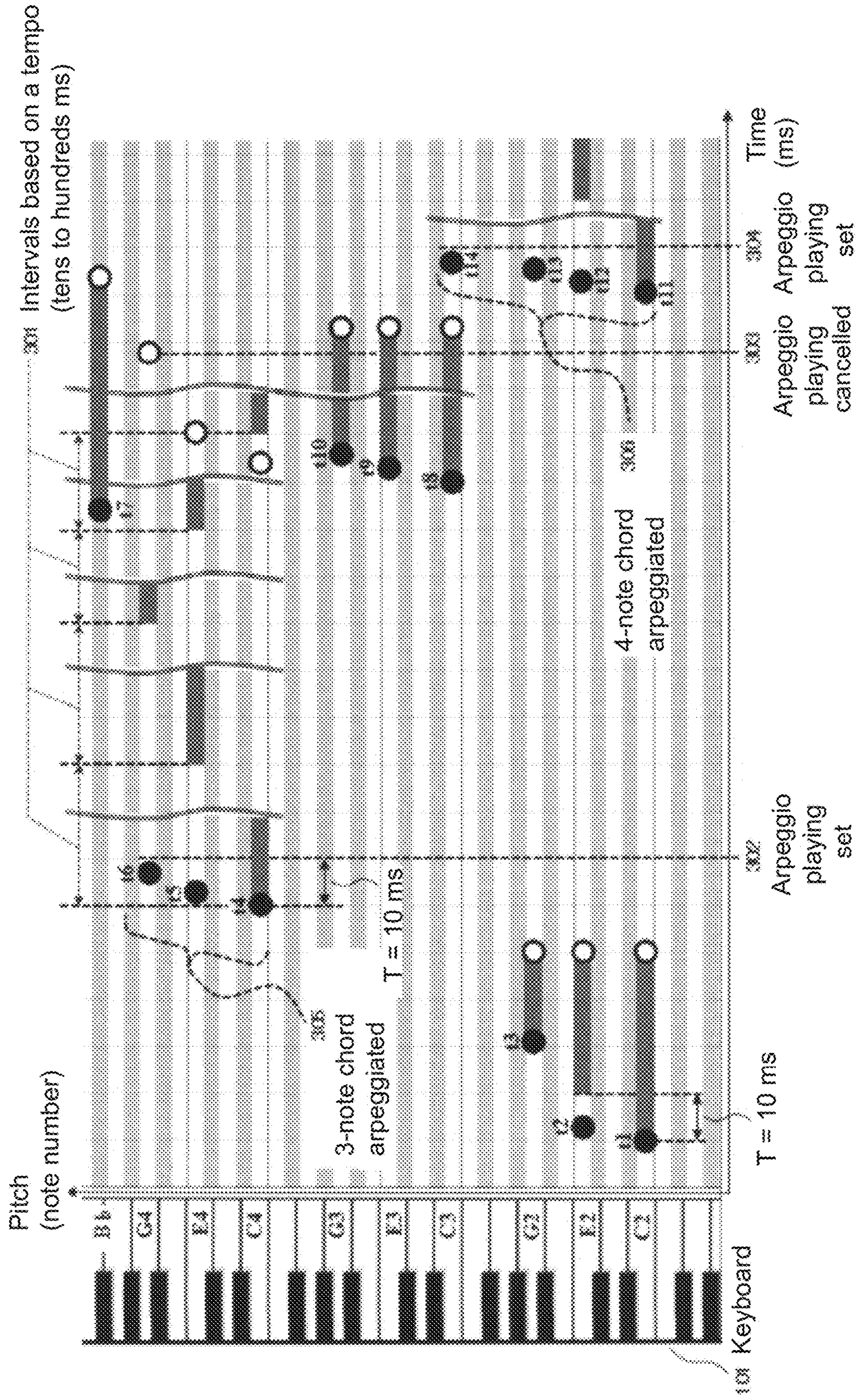
FIG. 3 is an explanatory diagram showing an operation example of an embodiment.

FIG. 3 is an explanatory diagram showing an operation example of the present embodiment. The vertical axis represents the pitch (note number) played on the keyboard 101, and the horizontal axis represents the passage of time (unit: milliseconds). The position of the black circle represents the note number and time of the key when the key is pressed, and the position of the white circle represents the note number and time of the key in which the key is released. In FIG. 3, numbers t1 to t14 are assigned in the order of key pressing events. The dark gray band following the black circle indicates that the key is being pressed. In the example of FIG. 3, the prescribed elapsed time T during which the keys are considered to be pressed at the same time is set to 10 msec (milliseconds), and the number of notes N for the chord playing determination is set to 3.

First, when the key pressing event t1 occurs while the automatic arpeggio enabled state has not been activated (or has been cancelled), the sound of the pitch C2 of the key pressing event t1 is started to be produced (the gray band period of t1), and measurement of the elapsed time is started. Subsequently, the key pressing event t2 occurs within the elapsed time T=10 milliseconds, which defines a time period for simultaneous key pressing, from the occurrence of the key pressing event t1, but while the determination as to whether a chord has been played is being made, the sound production of the musical tone corresponding to the key press event t2 is suspended, and therefore the start of the sound production of the pitch E2 of the key press event t2 does not occur (the gap period from the black circle of t2 to the start of the gray band line). When the elapsed time T of 10 milliseconds (judgment period for chord playing), which defines simultaneous key pressing determination period, has passed since the key press event t1, the number of keys that have been pressed to that time is only 2, which is less than N=3—the number of keys pressed for the chord playing determination. Thus, in this case, it is determined that a chord has not been played, and the normal sound production of the sound of the key press event t2 is started (the gray band line period of t2). Immediately after that, the key press event t3 occurs, but the key press event t3, which has occurred after the elapsed time T=10 milliseconds, which defines simultaneous key pressing determination period, is not considered to have been pressed at the same time, and the automatic arpeggio playing is not executed. Thus, the normal sound production of the sound of the key press event t3 is started without being arpeggiated (the gray band line period of t3).

After that, when the key pressing event t4 occurs while the automatic arpeggio enabled state has yet to be activated, the musical tone of the pitch C4 of the key pressing event t1 is started to be produced (the short gray band period of t4), and measurement of the elapsed time is started again. Subsequently, the key pressing events t5 (pitch E4) and t6 (pitch G4) occur (the black circles of t5 and t6) within the elapsed time T=10 milliseconds, which defines simultaneous key press period, from the occurrence of the key pressing event t4. At the time when these key pressing events t5 and t6 occur, the sound production instructions are not given until the elapsed time T has passed and the judgment result of the chord performance is available (immediately after the black circles t5 and t6 in FIG. 3). When T=10 milliseconds (chord playing determination period) elapses from the occurrence of the key press event t4, the number of musical tones becomes 3 in this case, which is equal to the number of notes that meets the requirement for a chord playing in this example (that is, the prescribed condition (here, the number of notes≥N=3) is satisfied). Therefore, in this case, from the time when T=10 milliseconds (chord determination period) elapses from the occurrence of the key pressing event t4 (i.e., at the timing 302 in FIG. 3), the sound production of automatic arpeggio playing of the notes with the pitches C4, E4, and G4 specified by the key pressing events t4, t5, and t6 is started.

At this time, since the sound production of the key press event t4 has already started (a short gray band period of t4), it is interpreted as the first sound of the automatic arpeggio playing, as it is, without separately generating a first sound for the automatic arpeggio playing.

As shown in the reference numeral 301 in FIG. 3, the intervals between sound productions of the automatic arpeggio playing for the pitch data C4, E4, and G4 of key press events t4, t5, and t6 (between the beginning timings of the respective gray band periods of t4, t5, and t6 in FIG. 3) is set to a time interval that corresponds to a tempo specified by the performer using the TEMPO knob 103 in FIG. 1. This time interval corresponds to the timing of the beat, which is determined by the tempo value, and is generally tens to hundreds of milliseconds.

Further, the sound production type of the arpeggio playing for the pitch data C4, E4, and G4 of the key pressing events t4, t5, and t6 is set to the type specified by the TYPE button group 104 of FIG. 1. In the example of FIG. 3, the Up/Down button in the TYPE button group 104 of FIG. 1 has been selected. Therefore, the continuous sound of the pitch data C4 of the key press event t4 (the first gray band period of t4) is followed by the continuous sound of the pitch data E4 of the key press event t5 (first gray band line period of t5), which is in turn followed by the continuous sound of the pitch data G4 of the key press event t6 (gray band line period of t6), thereby arpeggio playing is in a rising order in terms of pitches up to that point in time. Thereafter, arpeggio playing in a descending order is performed; the sound production of the pitch data E4 of the key press event t5 (the second gray band period t5) occurs, followed by the sound production of the pitch data C4 of the key press event t4 (the second gray band period of t4).

Further, when T=10 milliseconds (the chord determination period) elapses from the occurrence of the key press event t4, the automatic arpeggio enabled state is set (302 in FIG. 3).

During the period from when the automatic arpeggio enabled state is set to when the setting is cancelled, the CPU 201 automatically instructs the sound source LSI 204 to perform sound production/muting for the arpeggio playing of the three pitch data C4, E4, G4 of the key press events t4, t5, t6 shown as 305 in FIG. 3 at the time interval corresponding to the tempo value specified by the performer using the TEMPO knob 103 of FIG. 1 in accordance with one of the arpeggiating types specified by the TYPE button group 104 in FIG. 1. As a result, the desired arpeggio playing sound is produced from the sound source LSI 204.

While the automatic arpeggio enabled state is maintained, the key press event t7 occurs, but the automatic arpeggio enabled state based on the occurrence of the key press events t4, t5, and t6 has been already set (i.e., the prescribed condition for the automatic arpeggio playing is not satisfied for the key press event t7). Therefore, for the key press event t7, the normal sound production having the specified pitch B4♭ is performed instead of arpeggio playing for that note (the gray band line period of t7).

Further, the key pressing events t8, t9, and t10 occur within the elapsed time T=10 milliseconds, which defines the simultaneous key pressing period. However, again during this period, the automatic arpeggio enabled state is being set (i.e., the prescribed condition for automatic arpeggio playing is not met), and therefore, the sound production of the specified pitches C3, E3, and G3 of the key pressing events t4, t5, and t6 is performed in a normal manner without arpeggiating them (the respective gray band periods of t8, t9, and t10).

Then, a key release event for the key press event t4 occurs at the timing of the white circle of t4, but key release events for the other key press events t5 and t6 constituting the automatic arpeggio playing have not yet occurred. Therefore, the automatic arpeggio enabled state of the key pressing events t4, t5, and t6 is maintained. Subsequently, a key release event for the key press event t5 occurs at the timing of the white circle of t5, but a key release event for the remaining key press event t6 constituting the automatic arpeggio playing sound has not yet occurred. Therefore, the automatic arpeggio enabled state for the key press events t4, t5, and t6 is still maintained. Finally, when a key release event for the key press event t6 occurs at the timing of the white circle of t6, the key release events for all the key press events t4, t5, and t6 constituting the automatic arpeggio playing sounds have occurred and therefore, the automatic arpeggio enabled state of the key events t4, t5, and t6 is canceled (303 in FIG. 3).

Then the key press event t11 occurs after the automatic arpeggio enabled state is canceled. The musical sound of the pitch C2 of the key press event t11 is started to be produced (the short gray band period of t11), and measurement of the elapsed time is again started. Subsequently, the key pressing events t12, t13, and t14 occur within the elapsed time T=10 milliseconds, which are therefore considered to have been pressed at the same time, from the occurrence of the key pressing event tn. At the moment of occurrences of these key pressing events t12, t13, and t14, the sound production instructions are suspended until the elapsed time T elapses and the determination result for the chord performance is known (short periods immediately after the black circles of the events t12, t13, and t14 in FIG. 3). After that, when T=10 milliseconds (the chord play determination period) elapses from the occurrence of the key press event t11, the number of musical tones reaches 4, and the prescribed number of notes for the chord play N=3 or more is satisfied (the prescribed condition for a chord playing is satisfied). Therefore, when T=10 milliseconds (the chord determination period) has elapsed from the occurrence of the key pressing event t11, the automatic arpeggio playing of the four-note chord corresponding to the pitch data C2, E2, G2, and C3 of the key pressing events t11, t12, t13, and t14 shown as 306 in FIG. 3 is started. Then, the automatic arpeggio enabled state is set again (304 in FIG. 3).

FIG. 4 is a flowchart showing an example of the keyboard event processing executed by the CPU 201 of FIG. 2. As described above, this keyboard event processing is executed based on the interrupt generated when the key scanner 206 of FIG. 2 detects a change in the key pressing/releasing state of the keyboard 101 of FIG. 2. This keyboard event processing is, for example, a process in which the CPU 201 loads a keyboard event processing program stored in the ROM 202 into the RAM 203 and executes it. This program may be loaded from the ROM 202 to the RAM 203 when the power of the electronic keyboard instrument 100 is turned on and may be resident there.

In the keyboard event processing illustrated in the flowchart of FIG. 4, the CPU 201 first determines whether the interrupt notification from the key scanner 206 indicates a key press event or a key release event (step S401).

When it is determined in step S401 that the interrupt notification indicates a key press event, the CPU 201 determines whether the automatic arpeggio enabled state is currently set or not (step S402). In this process, for example, whether or not the automatic arpeggio enabled state is set is determined based on the logical value (either ON or OFF) of a predetermined variable (hereinafter, this variable is referred to as an “arpeggio enabled state variable”) stored in the RAM 203 of FIG. 2.

If it is determined in step S402 that the automatic arpeggio enabled state is set, the CPU 201 proceeds to step S407, which will be described later, and instructs the sound source LSI 204 to produce the normal playing sound. This state corresponds to the keyboard event processing when the key press events t7 to t10 in the operation explanatory diagram of FIG. 3 described above occur at the timings of the respective black circles. After that, the CPU 201 ends the keyboard event processing shown in the flowchart of FIG. 4, and returns to the main program processing (not particularly shown).

When it is determined in step S402 that the automatic arpeggio enabled state is canceled/not set, the CPU 201 stores the pitch data instructed to be produced in this key press event as a possible note for the arpeggio playing in RAM 203, for example (step S403).

Next, the CPU 201 adds 1, which corresponds to the current pressed key event, to the current number of notes that are regarded as simultaneous key pressing (a variable in RAM 203, for example, for counting the number of such notes) so as to update the current number of notes variable (step S404). The value of this current number of notes variable is counted this way in order to compare it with the chord playing establishing number of notes N for transitioning to the automatic arpeggio enabled state during the elapsed time T that defines simultaneous key pressing in the elapse time monitoring process shown in FIG. 5, which is described later.

After that, the CPU 201 determines whether or not the value of the current number of notes variable set in step S404 is 1, that is, whether or not the key is pressed for the first time in the state where the automatic arpeggio valid state is canceled/not set (step S405).

If the determination in step S405 is YES, the CPU 201 starts measurement of the elapsed time by starting an interrupt process by the timer 210, and set the value of the “elapsed time variable” (a predetermined variable in RAM 203, for example) that indicates the elapsed time towards transitioning to the automatic arpeggio enabled state (step S406) to 0. This state corresponds to the timing at which the key pressing events t1, t4, or t11 in the operation explanatory diagram of FIG. 3 described above occurs at the timing of the corresponding black circle.

After that, the CPU 201 issues sound production instructions for a normal sound production to the sound source LSI 204 (step S407). This state corresponds to the timing (the start timing of each gray band line following the black circles t1, t4, and t11 in FIG. 3) when the sound production instructions for the normal playing with pitch data C2, C4, and C2 are given in the occurrence timing of the respective key pressing event of t1, t4, or t11 in FIG. 3 (timing of each black circle). After that, the CPU 201 ends the current keyboard event processing shown in the flowchart of FIG. 4, and returns to the main program processing (not particularly shown).

If the determination in step S405 is NO, the CPU 201 does not execute the process of starting the measurement of the elapsed time in step S406 because the measurement of the elapsed time for shifting to the automatic arpeggio enabled state has already started. At the same time, the sound production instructions corresponding to the current key pressing event is suspended until the elapsed time T that defines simultaneous key pressing period elapses and the determination result of the chord performance is found (step S408). Specifically, the CPU 201 stores the pitch data corresponding to the current key press event in a predetermined variable on the RAM 203 of FIG. 2 (hereinafter, this variable is referred to as a “sound production on-hold variable”). Thereafter, the CPU 201 ends the current keyboard event processing shown in the flowchart of FIG. 4, and returns to the main program processing (not particularly shown). This state corresponds to the period immediately after each occurrence timing of the key pressing events t2, t5 and t6, t12, t13 and t14 in FIG. 3 (the period immediately after each black circle).

By repeating the series of processes from steps S403 to S408 for each keyboard event process described above, in the operation example of FIG. 3, for example, storing of the pitch data and counting up of the current number of notes variable for the new key pressing events t1 to t2, t4 to t6, or t11 to t14 that occur within the prescribed elapsed time T defining simultaneous key pressing from the timing of occurrence of the respective key press events t1, t4, or t11 in preparation for the transition to the automatic arpeggio enabled state, respectively, are respectively performed.

When it is determined in step S401 described above that the interrupt notification indicates a key release event, the CPU 201 determines whether or not the released key is the key that was subject to the automatic arpeggio playing (step S409). Specifically, the CPU 201 determines whether or not the pitch data of the released key is included in the pitch data group subject to the arpeggio playing stored in the RAM 203 (see step S403).

If the determination in step S409 is NO, the CPU 201 instructs the sound source LSI 204 to mute the normal playing sound of the pitch data (note number) included in the interrupt notification indicating the key release event that has been produced by the sound source LSI 204 (see step S407) (step S410). By this processing, in the operation example of FIG. 3 described above, the normal playing sound that was being produced by the sound source LSI 204 in each black belt line period corresponding to the occurrence of each key pressing event t1 to t3 and t7 to t10 is muted at the timing of each white circle at the end of the gray band line period.

If the determination in step S409 is YES, the CPU 201 deletes the record of the pitch data of the released key from the pitch data group subject to the arpeggio playing (see step S403) stored in the RAM 203 (step S411).

After that, the CPU 201 determines whether or not all the keys subject to the automatic arpeggio playing have been released (step S412). Specifically, the CPU 201 determines whether or not the pitch data of all the arpeggio playing notes stored in the RAM 203 have been deleted.

If the determination in step S412 is NO, the CPU 201 ends the current keyboard event processing shown in the flowchart of FIG. 4 while maintaining the automatic arpeggio enabled state, and returns to the main program processing (not particularly shown). This state corresponds to the timing when the key release event corresponding to the key press event t4 or t5 in FIG. 3 occurs (the timings of each white circles in t4 and t5 in FIG. 3), and at this point, the automatic arpeggio playing (the double dashed line periods of t4, t5) does not end.

When the determination in step S412 becomes YES, the CPU 201 instructs the sound source LSI 204 to stop the automatic arpeggio playing (step S413).

Then, the CPU 201 cancels the automatic arpeggio enabled state by setting the value of the arpeggio enabled state variable to a value indicating the logic state off (step S414).

The processes of steps S413 and S414 described above correspond to the cancellation timing 303 of the automatic arpeggio enabled state in FIG. 3 (303 in FIG. 3).

After that, the CPU 201 ends the current keyboard event processing shown in the flowchart of FIG. 4, and returns to the main program processing (not particularly shown).

Figure 5:
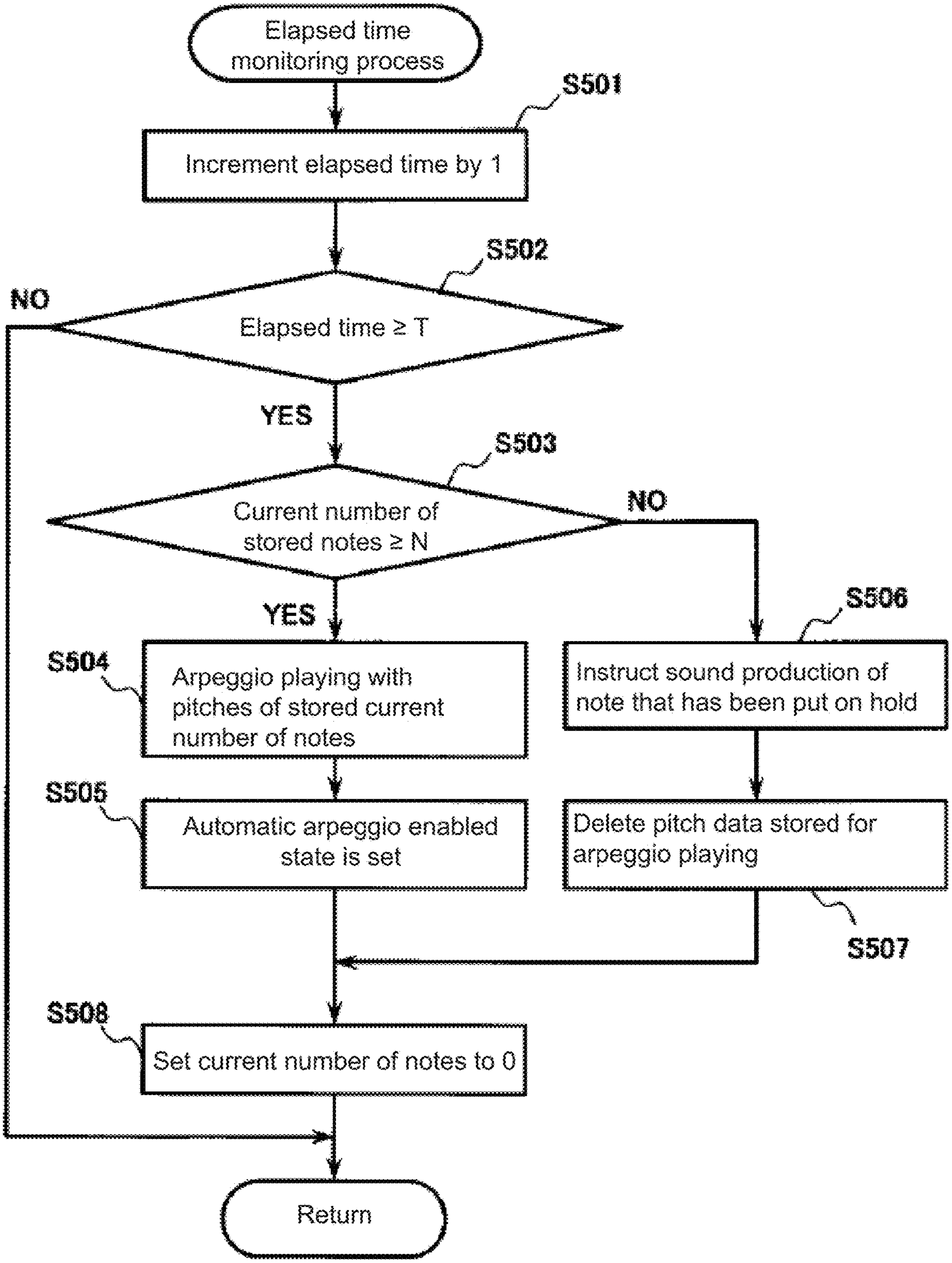
FIG. 5 is a flowchart showing an example of an elapsed time monitoring process.

FIG. 5 is a flowchart showing an example of the elapsed time monitoring process executed by the CPU 201 of FIG. 2. This elapsed time monitoring process is executed based on a timer interrupt that is generated in the timer 210 of FIG. 2 every 1 millisecond, for example. This elapsed time monitoring process is, for example, a process in which the CPU 201 loads an elapsed time monitoring processing program stored in the ROM 202 into the RAM 203 and executes it. This program may be loaded from the ROM 202 to the RAM 203 when the power of the electronic keyboard instrument 100 is turned on, and may be resident there.

In the elapsed time monitoring process exemplified by the flowchart of FIG. 5, the CPU 201 first increments (+1) the value of the elapsed time variable stored in the RAM 203 (step S501). The value of this elapsed time variable is cleared to a value of 0 in step S405 described above or step S506 described later. As a result, the value of the elapsed time variable indicates the elapsed time in milliseconds since the time the value was cleared to 0. As described above, in the operation explanatory diagram of FIG. 3, the elapsed time is cleared to 0 at the occurrence timing of each key pressing event t1, t3, t4, or t11 (at the timing of each black circle), and then measurement of the elapsed time for transitioning to the automatic arpeggio enabled state is started.

Next, the CPU 201 determines whether or not the value of the elapsed time variable is equal to or greater than the prescribed elapsed time T that defines a simultaneous key pressing period (step S502).

When the determination in step S502 is NO, that is, when the value of the elapsed time variable is less than the elapsed time T that defines the simultaneous key pressing time period, the CPU 201 terminates the current elapsed time monitoring process shown in the flowchart of FIG. 5, and returns to the main program process (not shown) in order to accept a new key press event.

When the determination in step S502 is YES, that is, when the value of the elapsed time variable becomes equal to or greater than the elapsed time T that defines the simultaneous key press time period, the CPU 201 determines whether or not the value of the current number of notes variable stored in the RAM 203 (see step S404 in FIG. 4) is equal to or greater than the threshold number of notes N (for example, 3) that is regarded as a chord playing (step S503).

If the determination in step S503 is YES, the CPU 201 instructs the sound source LSI 204 to perform automatic arpeggio playing of the pitch data of the number of notes indicated by the value of the current number of notes variable stored in the RAM 203 (step S504). The control of the automatic arpeggio playing is executed by a control program of the arpeggio playing that is provided separately.

Subsequently, the CPU 201 sets the automatic arpeggio enabled state by setting the logical value of the arpeggio enabled state variable stored in the RAM 203 to a value indicating that it is ON (step S505).

According to the above steps S504 and S505, in the operation example of FIG. 3 described above, shortly after the occurrence of the key press event t6, the musical tone waveform data 214 for the arpeggio playing sounds of the pitch data of the three tones corresponding to the key press events t4, t5, and t6 (305 in FIG. 3) are output from the sound source LSI 204 at the start timings of the respective gray band line periods of t4, t5, and t6 in FIG. 3. Similarly, shortly after the occurrence of the key press event t14, the musical tone waveform data 214 for the arpeggio playing sounds of the pitch data of the four notes corresponding to the key press events t11, t12, t13, and t14 (306 in FIG. 3) are output from the sound source LSI 204 at the start timings of the respective gray band line periods of t11, t12, and t13 in FIG. 3.

If the determination in step S503 is NO, the CPU 201 issues sound production instructions for the note for which the sound production has been on hold in step S408 of FIG. 4 to the sound source LSI 204 (step S506). Specifically, the CPU 201 issues to the sound source LSI 204 the sound production instructions for the normal sound playing of each pitch data stored in the sound production on-hold variable on the RAM 203. This state corresponds to the state where the sound production of the pitch data E2, which has been on hold at the time of the key press event t2 in FIG. 3 (at the timing of the black circle in t2), is started in the sound source LSI 204 (the gray band line period in t2).

After that, the CPU 201 deletes the pitch data that have been stored in the RAM 203 for arpeggio playing in step S403 of FIG. 4 (step S507).

After the process of step S505 or S507, the CPU 201 clears the value of the current number of notes variable stored in the RAM 203 to 0 (step S508).

Thereafter, the CPU 201 ends the elapsed time monitoring process shown in the flowchart of FIG. 5, and returns to the main program process (not shown).

In the operation explanatory diagram of FIG. 3 described above, the key pressing event t3 occurred after the key pressing events t1 and t2. However, when the elapsed time T that defines simultaneous key pressing period has passed from the occurrence timing of the key pressing event t1 (i.e., when the determination at step S502 becomes YES), the value of the current number of notes variable is 2 (corresponding to the key press events t1, t2) and does not reach the threshold number of notes that is regarded as a chord playing (the determination in step S503 is NO). As a result, the value of the current number of notes variable is cleared to 0 in step S508 without executing the arpeggio playing sound production instruction process (step S504) and the automatic arpeggio enabled state setting process (step S505). Thus, in the processing of the flowchart of FIG. 4 described above, the determination in step S402 is NO (i.e., the automatic arpeggio enabled state is not set), the value of the current number of notes variable is 1 in step S404, the determination in step S405 is YES, and step S406 is executed. As a result, the measurement of the elapsed time for shifting to the automatic arpeggio enabled state starts again from the time when the key pressing event t3 occurs. That is, if the number of notes N for the chord playing determination is not satisfied when the elapsed time T, which defines simultaneous key pressing period, has been arrived, whether or not the condition for transitioning to the automatic arpeggio enabled state is satisfied is evaluated again starting from the key pressing event (=t3) that occurs immediately thereafter.

As described above, the present embodiment determines whether or not a chord playing has been performed according to the number of keys pressed on the keyboard 101 by the performer and the time intervals of such plurality of key presses. And only for the note group corresponding to the keys that have determined to be pressed simultaneously, the automatic arpeggio enabled state is set and the automatic arpeggio playing sounds are produced, and for the notes other than those, the normal playing sound is produced immediately.

According to the above embodiment, the electronic musical instrument can produce automatic arpeggio playing only for the required musical tones if the performer naturally plays a distributed chord (arpeggio performance) and a melody (normal performance) in an appropriate note range without performing a special operation, such as actually performing arpeggios on the keyboard 101. Therefore, the performer can concentrate on his/her own performance without compromising the performance or the musical tone.

As another embodiment, a split point that divides a left area and a right area can be defined in the keyboard 101 so that an automatic arpeggio playing can be determined for each of the left and right key areas independently, so that the arpeggio playing may be performed automatically in correspondence with the performance of the respective hands.

In the above-described embodiments, an example in which the automatic arpeggio playing function is implemented in the electronic keyboard instrument 100 has been described, but in addition to this, this function can also be implemented in an electronic string instrument such as a guitar synthesizer or a guitar controller.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An electronic musical instrument, comprising:

a plurality of performance elements that specify pitch data;

a sound source that produces musical sounds; and a processor configured to perform the following:

when a user performance of the plurality of performance elements is such that a chord is played by a user within a set time period while automatic arpeggio playing sounds are not being produced, instructing the sound source to produce automatic arpeggio playing sounds corresponding to pitch data specified by the user performance;

when a user performance of the plurality of performance elements occurs but is such that a chord is not played by the user within the set time period, instructing the sound source to produce a sound of a pitch data specified by the user performance without producing the automatic arpeggio playing sound; and when a user performance of the plurality of performance elements is such that the user plays any number of the performance elements while automatic arpeggio playing sounds are being produced, instructing the sound source to produce a sound of a pitch data specified by the user performance while the automatic arpeggio playing sounds are being produced.

2. The electronic musical instrument according to claim 1, wherein whether or not the automatic arpeggio playing sounds are being produced is determined by the processor by determining whether or not an automatic arpeggio enabled state is set.

3. The electronic musical instrument according to claim 2, wherein the processor determines that the chord is played by the user within the set time period when the number of the performance elements operated by the user within the set time period is equal to or greater than a prescribed threshold number, and wherein the set time period is a prescribed time period that starts from a timing of a first operation on the plurality of performance elements.

4. The electronic musical instrument according to claim 3, wherein the prescribed time period and the prescribed threshold number are settable differently depending on usage situations.

5. The electronic musical instrument according to claim 3, wherein when the chord is played by the user within the set time period while automatic arpeggio playing sounds are not being produced, the processor sets the automatic arpeggio enabled state.

6. The electronic musical instrument according to claim 5, wherein when the automatic arpeggio enabled state is set, the processor does not instruct the sound source to stop producing the automatic arpeggio playing sounds until all of the performance elements operated to produce the automatic arpeggio playing sounds are released, and when all of the performance elements operated to produce the automatic arpeggio playing sounds are released, the processor instructs the sound source to stop producing the automatic arpeggio playing sounds, and cancel the automatic arpeggio enabled state.

7. A method of sound production performed by a processor in an electronic musical instrument that includes, in addition to the processor, a plurality of performance elements that specify pitch data and a sound source that produces musical sounds, the method comprising, via said processor:

when a user performance of the plurality of performance elements is such that a chord is played by a user within a set time period while automatic arpeggio playing sounds are not being produced, instructing the sound source to produce automatic arpeggio playing sounds corresponding to pitch data specified by the user performance;

when a user performance of the plurality of performance elements occurs but is such that a chord is not played by the user within the set time period, instructing the sound source to produce a sound of a pitch data specified by the user performance without producing the automatic arpeggio playing sound; and when a user performance of the plurality of performance elements is such that the user plays any number of the performance elements while automatic arpeggio playing sounds are being produced, instructing the sound source to produce a sound of a pitch data specified by the user performance while the automatic arpeggio playing sounds are being produced.

8. The method according to claim 7, wherein whether or not the automatic arpeggio playing sounds are being produced is determined by the processor by determining whether or not an automatic arpeggio enabled state is set.

9. The method according to claim 8, comprising:

determining that the chord is played by the user within the set time period when the number of the performance elements operated by the user within the set time period is equal to or greater than a prescribed threshold number, and wherein the set time period is a prescribed time period that starts from a timing of a first operation on the plurality of performance elements.

10. The method according to claim 9, comprising:

when the chord is played by the user within the set time period while automatic arpeggio playing sounds are not being produced, setting the automatic arpeggio enabled state.

11. The method according to claim 10, comprising:

when the automatic arpeggio enabled state is set, not instructing the sound source to stop producing the automatic arpeggio playing sounds until all of the performance elements operated to produce the automatic arpeggio playing sounds are released, and when all of the performance elements operated to produce the automatic arpeggio playing sounds are released, instructing the sound source to stop producing the automatic arpeggio playing sounds, and cancel the automatic arpeggio enabled state.

12. A non-transitory computer-readable storage medium storing a program executable by a processor in an electronic musical instrument that includes, in addition to the processor, a plurality of performance elements that specify pitch data and a sound source that produces musical sounds, the program causing the processor to perform the following:

when a user performance of the plurality of performance elements is such that a chord is played by a user within a set time period while automatic arpeggio playing sounds are not being produced, instructing the sound source to produce automatic arpeggio playing sounds corresponding to pitch data specified by the user performance;

when a user performance of the plurality of performance elements occurs but is such that a chord is not played by the user within the set time period, instructing the sound source to produce a sound of a pitch data specified by the user performance without producing the automatic arpeggio playing sound; and when the user performance of the plurality of performance elements is such that the user plays any number of the performance elements while automatic arpeggio playing sounds are being produced, instructing the sound source to produce a sound of a pitch data specified by the user performance while the automatic arpeggio playing sounds are being produced.

* * * * *